United States Patent [19]
Langer

[11] Patent Number: 5,111,685
[45] Date of Patent: May 12, 1992

[54] ROADWAY SIMULATOR RESTRAINT

[75] Inventor: William J. Langer, Eden Prairie, Minn.

[73] Assignee: MTS Systems Corporation, Eden Prairie, Minn.

[21] Appl. No.: 453,627

[22] Filed: Dec. 20, 1989

[51] Int. Cl.⁵ .......................................... G01M 17/00
[52] U.S. Cl. ........................................ 73/117; 73/126
[58] Field of Search ............. 73/117, 126, 127, 865.9, 73/865.6, 866.4, 146, 669, 670; 434/62, 66, 67

[56] References Cited

U.S. PATENT DOCUMENTS

| | | | |
|---|---|---|---|
| 3,914,990 | 10/1975 | Borg | 73/670 |
| 4,238,954 | 12/1980 | Langer | 73/146 |
| 4,455,866 | 6/1984 | Barrigar | 73/117 |
| 4,798,088 | 1/1989 | Haeg et al. | 73/669 |
| 4,862,737 | 9/1989 | Langer | 73/117 |

FOREIGN PATENT DOCUMENTS

| | | | |
|---|---|---|---|
| 546927 | 3/1977 | U.S.S.R. | 434/67 |
| 890428 | 12/1981 | U.S.S.R. | 434/66 |
| 1211625 | 2/1986 | U.S.S.R. | 73/670 |

OTHER PUBLICATIONS

A Dynamometer on which the Dynamic Behavior of a Passenger Can can be Simulated, by Jean Odier, published in Proc. Instn. Mech. Engrs., vol. 186, Jul. 1972, pp. 87-96 & D25.
Road-Holding: Braking and Traction, Paper 700367, New York, Society of Automotive Engineers, Inc., 1970; pp. 204-209; by Jean Odier.
Indoor Vehicle Braking Simulation: Correlation and Comparison with Road Testing, Paper 730,562, New York: Society of Automotive Engineers, Inc., 1973; 8 page booklet by Jean Odier.
The Road Simulation Rig, Valeo Publisher, acknowledged prior art, publication date unknown, cover & pp. 1-8.

Primary Examiner—Tom Noland
Attorney, Agent, or Firm—Kinney & Lange

[57] ABSTRACT

A roadway simulator restraint system supports a vehicle at each of its wheels on simulated roadways which comprise endless belts suitably driven to cause wheel rotation. A plurality of passive links are provided for restraining the vehicle in longitudinal, lateral, and yaw degrees of freedom, while permitting free motion in roll and pitch moments, and vertical directions. Additionally, the linkages can provide inputs in aerodynamic force directions to simulate responses to vehicle dynamics during actual operation. The individual roadways that support the wheels can be independently controlled as to speed, and can be turned. Suitable force measurements are made in desired axes to provide for a complete controlled simulation of vehicle operation on an actual roadway.

19 Claims, 5 Drawing Sheets

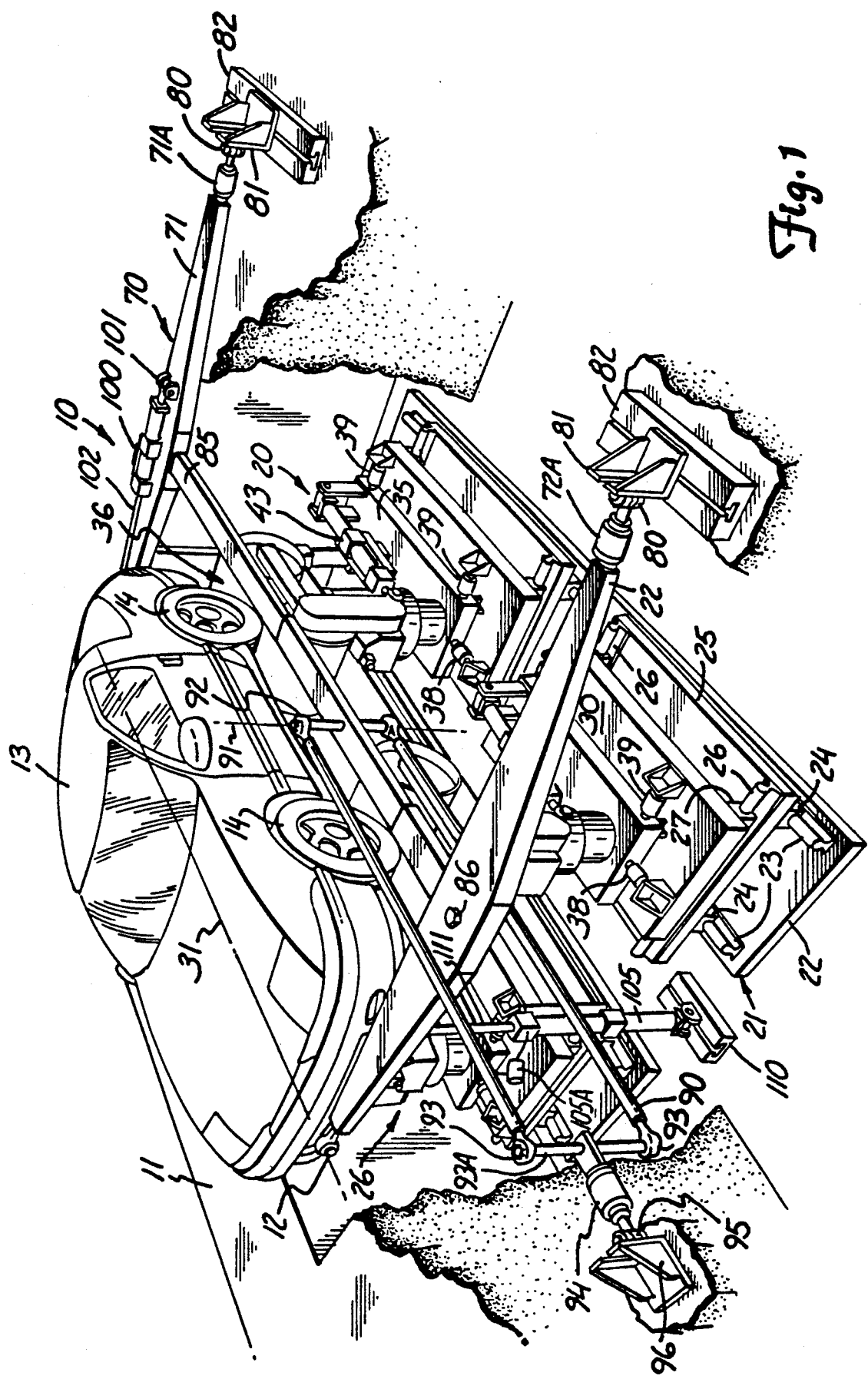

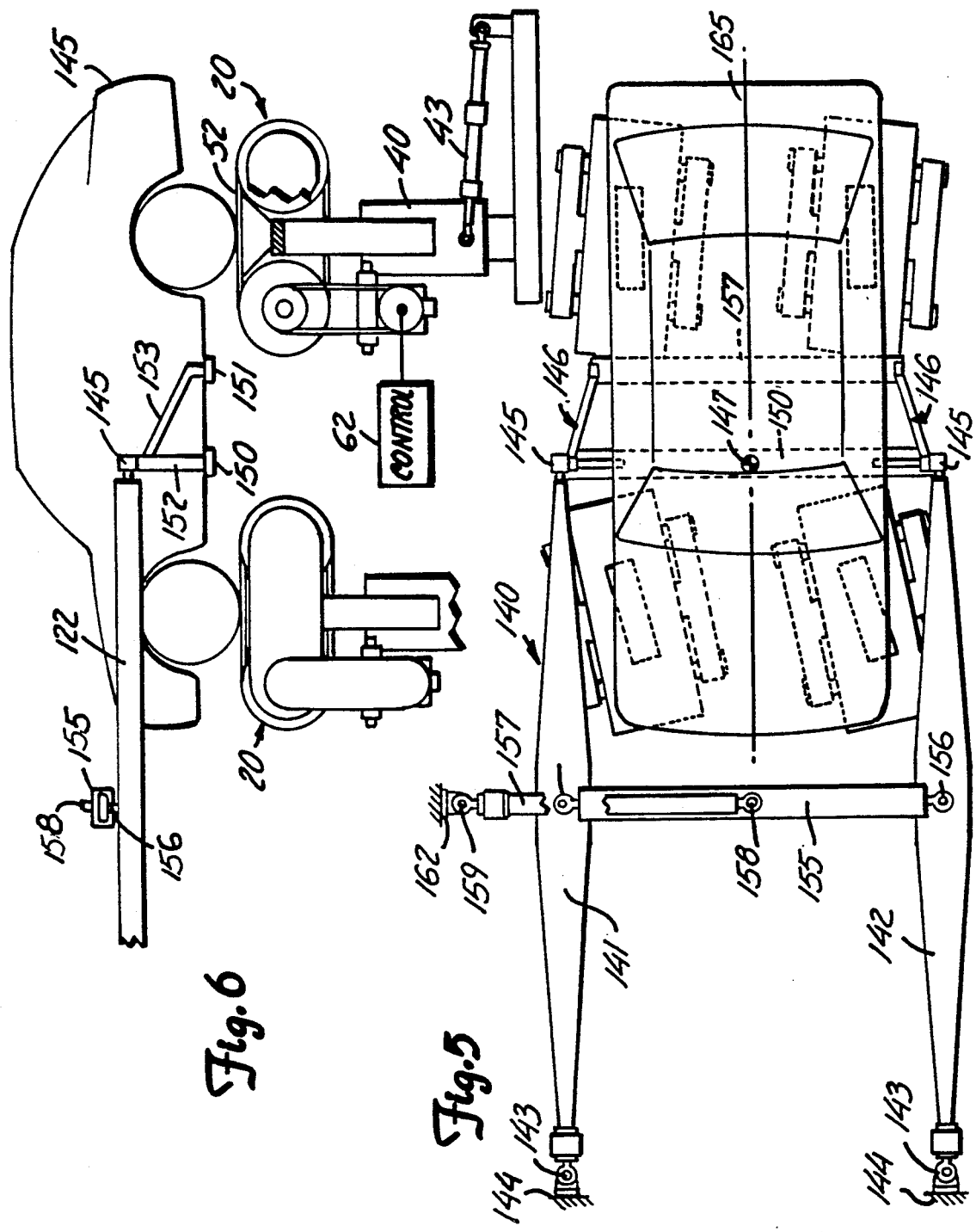

ROADWAY SIMULATOR RESTRAINT

BACKGROUND OF THE INVENTION

The present invention relates to restraints for vehicles during laboratory testing which permits simulating actual loading of a vehicle during operation. U.S. Pat. No. 4,862,737 shows a roadway loading simulator having a restraint linkage. The linkage in U.S. Pat. No. 4,862,737 permits controlling the position of the vehicle through positive control in one or more selected directions without affecting the loading in other directions.

The present invention restrains movement in three degrees of freedom, but permits movement in other degrees of freedom. This arrangement provides the ability to more closely simulate the actual road load conditions encountered by a vehicle.

SUMMARY OF THE INVENTION

The present invention relates to a simulation system for laboratory testing of a vehicle that restrains the vehicle with respect to belt-type roadways in a manner that permits evaluation of a vehicle by substantially exact duplication of actual road conditions. The use of simulated roadways has become important in the development of automotive designs. These roadways generally comprise an individual endless belt for mounting each of the respective vehicle wheels. The belts are driven to simulate driving the vehicle over a road. The belts are on supports that permit steering, as well as being variable speed so that they can be adjusted to simulate different driving conditions. The roadways can be individually vertically adjusted for inputting vehicle driving transients.

The vehicle is restrained with respect to the simulated roadways through a linkage that restrains the vehicle from movement in longitudinal direction (fore and aft), in lateral direction (side-to-side) and in yaw (steering motion). The vehicle restraints are passive restraints which do not affect the vehicle's dynamics, but which can be used for measuring loads if desired in the different directions of restraint. The vehicle is maintained for free movement in roll, pitch and vertical directions, and if desired, force inputs for roll, and aerodynamic forces in vertical direction can be added into the test vehicle to simulate the effect of increased speed, cornering or the like on the vehicle.

The present device permits the reproduction of vehicle motion over the road by applying a speed component and direction at each &:ire that is the same as experienced under actual road conditions for the same driving maneuvers, and also to input aerodynamic forces to the vehicle.

BRIEF DESCRIPTION OF THE DRAWINGS

FIG. 1 is schematic representation of a vehicle roadway simulation system made according to the present invention;

FIG. 5 is a top-plan schematic view of a modified linkage made according to the present invention;

FIG. 6 is a side view of the form of the invention shown in FIG. 5;

DETAILED DESCRIPTION OF THE PREFERRED EMBODIMENTS

Figure 3:
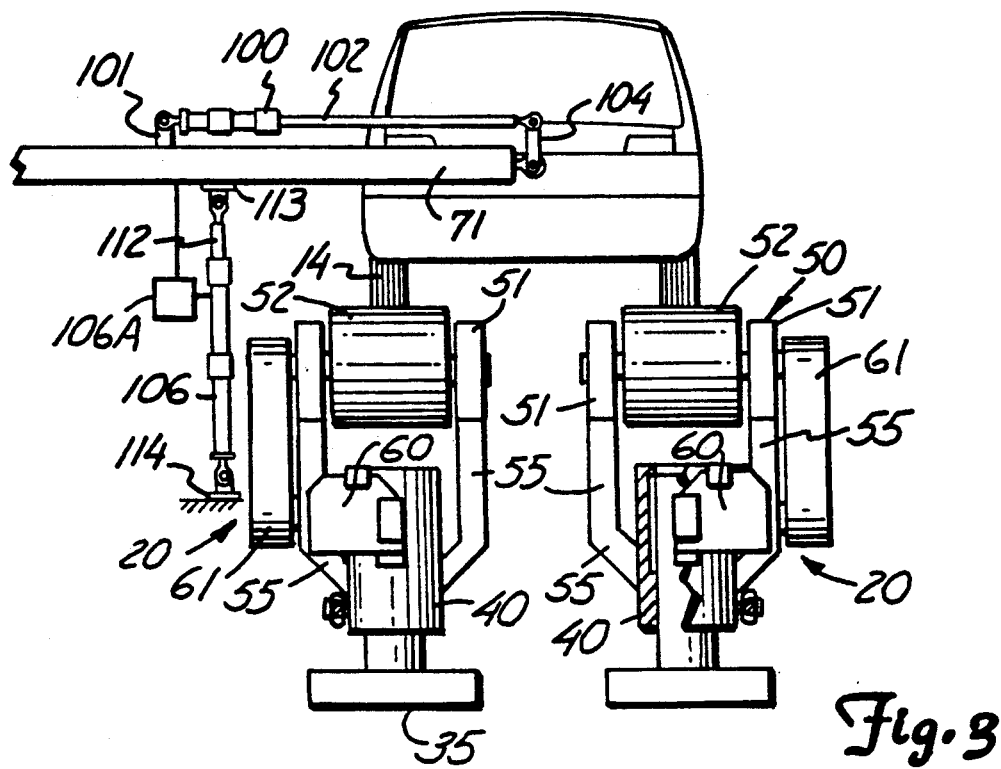
FIG. 3 is a schematic rear view of the vehicle in FIG. 1.

Referring to FIG. 1, a vehicle restraint and simulation system made according to the present invention is illustrated generally at 10. It includes a support base 11, which generally comprises a large concrete structure having a pit indicated generally at 12 in which the main roadway mechanisms are mounted, so that a vehicle 13 to be tested is at about the level of the surface surrounding the pit 12.

When the term "base" is used, it means the support for the restraint system relative to which other components are mounted.

The vehicle 13 has four wheels, two of which are indicated at 14. The vehicle can be either a four-wheel drive or two-wheel drive vehicle. Each of the wheels is supported with a substantially identical roadway assembles indicated at 20. The roadway assemblies are substantially identical, but the right and left-hand units are mirror images of each other. Each roadway assembly is supported relative to the base 11 through wheelbase adjustment plates indicated generally at 21 which include a first plate 22 that is anchored relative to the base, and which has a pair of spaced apart guide rails 23 thereon. The guide rails are T-type or dovetail rails that are conventional, and the rails 23 slidably mount journals 24 for sliding movement along the rails. The journals 24 in turn support a wheel base adjustment plate so that when the plate 25 is moved along the rails 23, the differences in wheel bases for different test vehicles can be accommodated. The journals 24 are made so that they can be locked in place at the desired position for wheel base adjustment.

Each wheel base adjustment plate 25 also has rails 26 on an upper surface thereof which in turn support journals 27 that are attached to a wheel track adjustment plate 30. The wheel track adjustment plate slides transversely of a longitudinal axis 31 of the vehicle 13 and is clamped in place when the wheels and tires 14 are at the desired location relative to the roadway assemblies 20.

The track adjustment plate 30 in turn supports a mounting plate 35 for a flat belt roadway indicated generally at 36. The mounting plate 35 is mounted so that it is moveable on top of the track adjustment plate 30, and is restrained by load sensors or load cells for sensing longitudinal loads indicated generally at 38, and by sensors for sensing transverse load indicated generally at 39. These load sensors 38 and 39 are made so that they will measure forces on the respective roadway assemblies in both longitudinal and transverse directions of the vehicle 13.

Figure 4:
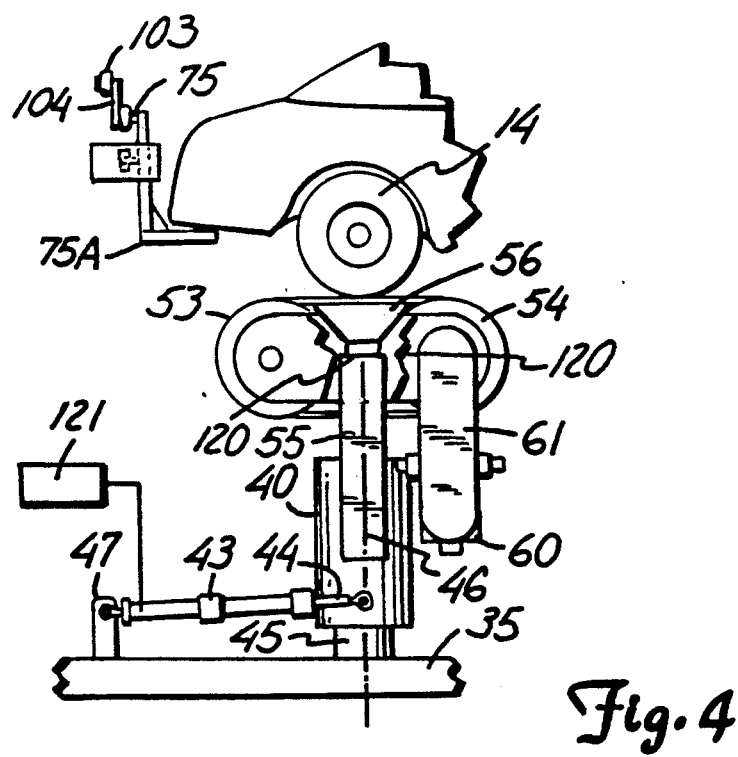
FIG. 4 is a schematic fragmentary side view of the vehicles and supports shown in FIG. 3.

The roadway assemblies 20 are of substantially conventional design, but are controllable for vertical movement and also for pivotal movement about a vertical axis. As generally shown in FIGS. 3 and 4, in perhaps greater detail, the roadway support plates 35 include a cylinder or housing 40 that is rotatably mounted onto the plate 35 about a vertical axis using a suitable support such as a turn table, or, for example, a central tube or shaft on which the housing 40 can rotate. The control of the rotation of the housing 40 is achieved with a roadway steer actuator 43 which has an extendable or retractable rod 44 that is connected to a suitable link through a rod end 45 to the housing 40 and will, upon extension and retraction, cause the housing 40 to rotate about a vertical axis indicated generally at 46. The base end of the roadway steer actuator 43 is supported on a suitable bracket 47 back to the roadway support plate 35.

The cylinder 40 is made to support an external H-type frame 50 that is shown only schematically, and generally of the type shown in prior U.S. Pat. No. 4,238,954. Frame 50 has side frame member 51 that extends in direction parallel to the longitudinal axis of the vehicle on opposite sides of an endless belt 52 that is supported on a pair of drums or rollers 53 and 54. The frame members 51 rotatably support the drums 53 and 54. The drum 54 is a driven drum. The frame 50 is mounted back to the housing 40 in a suitable manner, such as with brackets 55 mounted to support both side members 51 of the frame 50. The frame side members 51 are joined by a transverse cross member that supports a belt support bearing 56 in the center portions of the belts 52 for that roadway assembly. The belt in turn supports the one wheel 14 of the vehicle as shown in FIG. 4.

The roadway assemblies are made so that they can be adjusted vertically (at least four inches) and this can be done with suitable mechanical or hydraulic actuators or supports. For example, plates 35 can be vertically adjustable, if desired. The vertical adjustment provides for leveling of the test vehicle on the various roadway systems. The belt 52 of each roadway assembly is individually driven through a drive motor 60 that is mounted onto each of the respective housing 40, and which drives the roadway belt 52 through a drive belt and pulley system 61 to rotate the drum 54 at a desired speed so that the desired lineal speed of the belt 52 which simulates road speeds will be achieved.

The drive motors 60 are variable speed motors (preferably hydraulic) and the motors for all of the roadway assemblies 60 are driven in parallel so that all of the roadway belts will be running at the same speed. The motors are varied in speed through a suitable control valve 62 (FIG. 6) that are shown schematically. The program for the speed of the motors 60 can be controlled through a central controller that controls speed as one of the controlled functions.

The belts 52 will be run in a selected speed, which can be varied as desired, up to about 250 kph (155 mph) in either direction. The motors 60 are bi-directional so the belts can run in either direction of movement.

Figure 2:
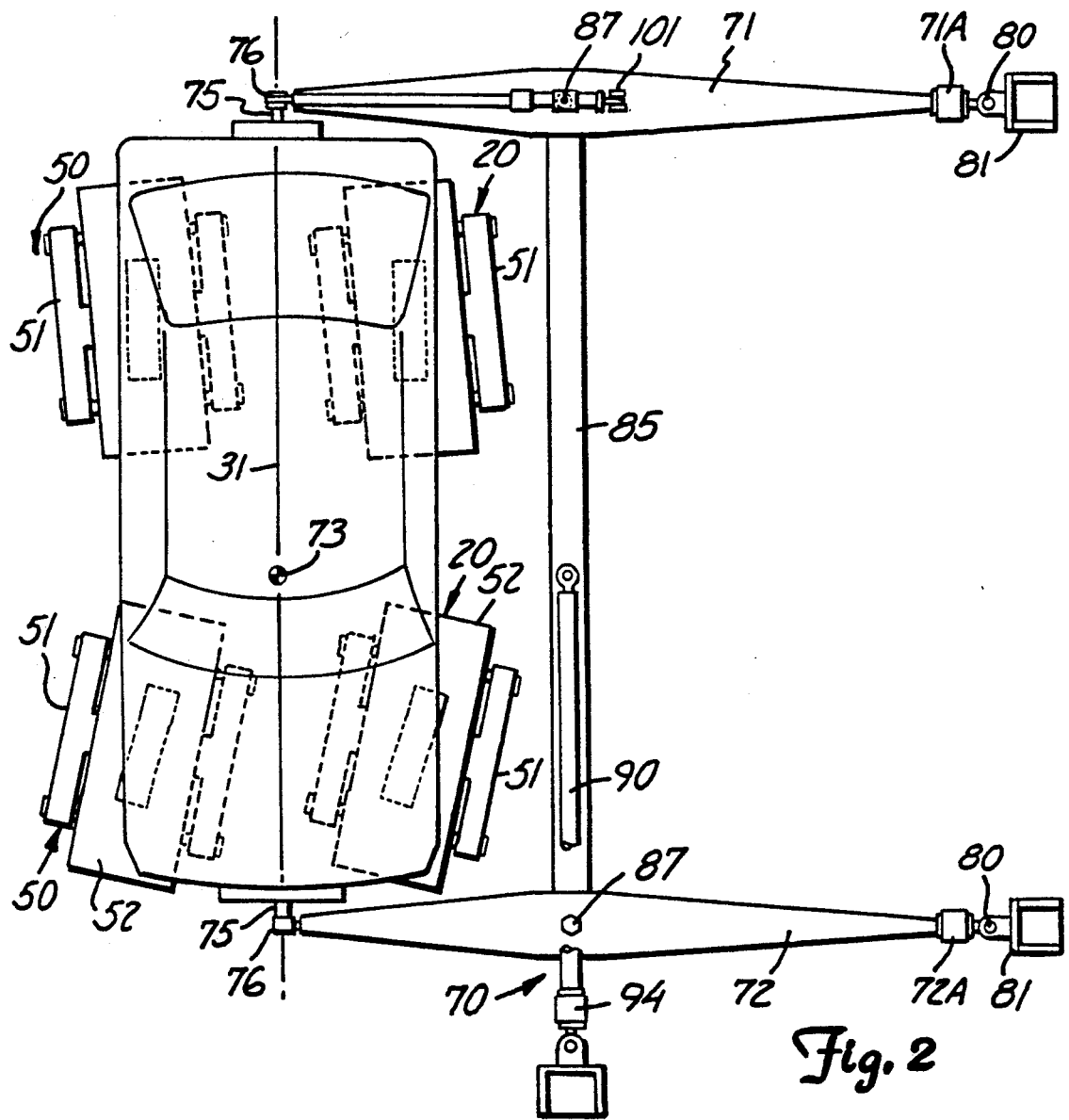
FIG. 2 is a schematic top-plan view of the linkage system shown in FIG. 1.

The steering of the support belt 52 of each roadway assembly can be done by rotating the housing 40 through the extension or retraction of the roadway actuator 43, and this can be programmed into the operational test for the vehicle as desired. Such steer is shown schematically in FIG. 2, and it should be noted that the angles of steer can be controlled to be in the range of 5 degrees for rear wheels (rear wheel steer vehicles) and 17 degrees for front wheel steer.

The roadway assemblies 20 can be properly positioned as desired because the wheel base and track of the vehicle 13 will be known. Once the roadway assemblies are set and the test vehicle 13 is in place on the roadway belts 52, the vehicle is then restrained by the external restraint system of the present invention shown generally at 70. This a three axis restraint linkage system, and as shown in FIG. 1, a pair of spaced beams 71 and 72 are mounted to the base 11 for providing a lateral restraint (a first axis restraint) to the vehicle at a pair of spaced points on a line passing through a desired kinematic center, and as shown this line is the longitudinal axis 31. The beams 71 and 72 thus are at the front and rear of the test vehicle 13. The longitudinal axis 31 passes through the center of gravity 73 of the vehicle. The test vehicle 13 is held by the beams through a pair of pins 75, one of which is at the front and the other of which is at the rear of the vehicle. The pin axes both lie on the vehicle longitudinal axis, which, as stated, passes through the center of gravity. The beams 71 and 72 have first ends connected to the pins 75 through spherical ball joints (universal pivotal connections) indicated generally at 76 (see FIG. 2). The opposite or second ends of the beams 71 and 72 are connected with respect to the base 11 through actuators 71A and 72A, that also are used to measure loads. The actuators 71A and 72A in turn are connected to spherical connections (universal pivotal connections) 80 which connect the beams to brackets 81,81.

Brackets 81 in turn are attached through adjustment plates 82 back to the base 11. The adjustment plates provide adjustment for different wheel base dimensions, so that they have slots that extend parallel to the longitudinal axis 31, and permit positioning the beams at a proper location to fit the vehicle. The actuators 71A and 72A act as rigid connectors along the longitudinal axis of the beams 71 and 72 and restrain the vehicle in lateral direction (transverse to the longitudinal axis 31).

The beams 71 and 72 are connected together by a first link 85 that is pivotally connected to the respective beams through universal pivotal connections 87 at points lying on the central longitudinal axis of the respective beams. The longitudinal axis of the first link 85 (the line between the point of connection is parallel to the line between the beam connections to the test vehicle, and as shown, is parallel to the longitudinal axis 31 of the test vehicle 13. This first link 85 is restrained from movement along its longitudinal axis (the line between its connection points) through the use of a second link 90 that is connected to the first link through universal pivoting (spherical) connection that is at a point such that a plane normal to the longitudinal axis of the first link and passing through the point of connection of the second link contains the center of gravity 73 as well. The second link 90 as shown comprises two link sections that are made so they will clear tooth the first link 85 and the beam 72. The center points for the spherical connection of the two second link sections 90 are on an axis 91 which lies on the plane normal to the axis of the first link and passing through the center of gravity.

The end of the second link 90 opposite from the spherical connections 92 at axis 91 is connected through spherical connections 93 to a shaft 93A which is an actuator connected to 94 which in turn is connected through a spherical connection 95 to a bracket 96 that is supported relative to the base for restraining the test vehicle 13 for movement parallel to the line between the connection points of the ends of the beams 71 and 72 on the test vehicle. The actuator is also a sensor for determining forces along its axis. The second link 90 is parallel to the first link 85, and the longitudinal axis of the second link is therefore also parallel to the longitudinal axis 31 of the test vehicle. The actuator-load sensor 94 will measure loads or forces in longitudinal direction of the test vehicle, that is, along a second axis of the test vehicle, while the actuator-load sensors 71A and 72A measure loads in lateral direction of the vehicle.

The mounting of the beams 71 and 72 and two links 85 and 90, as shown, restrains the test vehicle in directions along the longitudinal axis, the lateral or side-to-side axis and in yaw, that is, the beams retrain rotation of the vehicle about a vertical axis passing through the center of gravity. The linkage just described permits free movement in roll about the longitudinal axis, and in pitch (rotation about a lateral axis passing through the center of gravity), and in vertical directions.

In order to induce aerodynamic forces on the automobile or vehicle and further simulate the actual road conditions, the device of the present invention can be controlled to place a roll input into the test vehicle. This is accomplished by utilizing a servo-controlled roll actuator 100 that is mounted on a suitable bracket 101 onto the beam 71 at the rear of the test vehicle as shown. The roll actuator 100 has an retractable and extendable rod 102 that has a universal rod end (spherical coupling) indicated at 103 coupled to a lever 104 that in turn is connected to the rear coupling pin 75 that is attached to the bracket 75A fixed to the test vehicle body. The roll cylinder or actuator 100 is normally programmed to provide no restraint to the roll of the vehicle, so the vehicle is free to roll in response to external forces. However, by properly controlling and programming the servo controlled actuator 100, roll moment loading can be introduced into the test vehicle at desired speeds, or when the roadways are steered, to simulate roll loads in a curve or corner. This input again is through the longitudinal axis that passes through the test vehicle's center of gravity, so that it simulates the responses of a vehicle when it is subjected to forces that cause a roll.

Additionally, aerodynamic lift or vertical lifting action can be simulated by providing a pair of vertical servo-actuators or cylinders, one of which is shown in FIG. 1 at 105, at the front of the vehicle, and the other of which is shown in FIG. 3 at 106. The actuator 105 is mounted on a suitable support 110 and has an extendable and retractable rod that is connected through a suitable bracket to the under side of the beam 72. The position of the vertical lift actuators 105 and 103 can be selected as desired, and as shown they are positioned between the first link 85 and the vehicle longitudinal axis 31. The rear actuator 106 has an extendable and retractable rod 112 that is attached with a bracket 113 to the beam 71, and a suitable bracket 114 is used for attaching the actuator base end with respect to base 11.

The actuators 105 and 106 are servo controlled actuators, and by operating the actuator 105 while the actuator 106 remains stationary, a pitch moment (a moment about a lateral axis passing through the vehicle center of gravity) can be placed in the test vehicle 13 as well. Thus, the actuators 105, 106 and the actuator 100 provide for roll moments, aerodynamic lift, either at the front or rear, and vertical movement as well. The forces are measured in the restrained directions, through the load sensors and thus closed loop operation is possible. The actuators 105 and 106 have displacement sensors 105A and 106A (LVDTs) to measure pitch and vertical displacements.

The load on each of the individual wheels and tires also can be measured with suitable sensors located in the belt support members 56. Vertical load cells are located just above the support members 56, and such a load cell is shown schematically at 120 in FIG. 4. Additionally, a steer force sensor 121 is connected to measure forces in each of the roadway steer actuators 43. The lateral loads on the roadway assemblies can be sensed by the lateral actuators 39 shown in FIG. 1.

Longitudinal load signals on the roadway assemblies are provided through the actuators 38, so that loads on the roadways in the restrained direction can be sensed directly. Loads also are sensed on the beams and links used for restraining the test vehicle.

Figure 8:
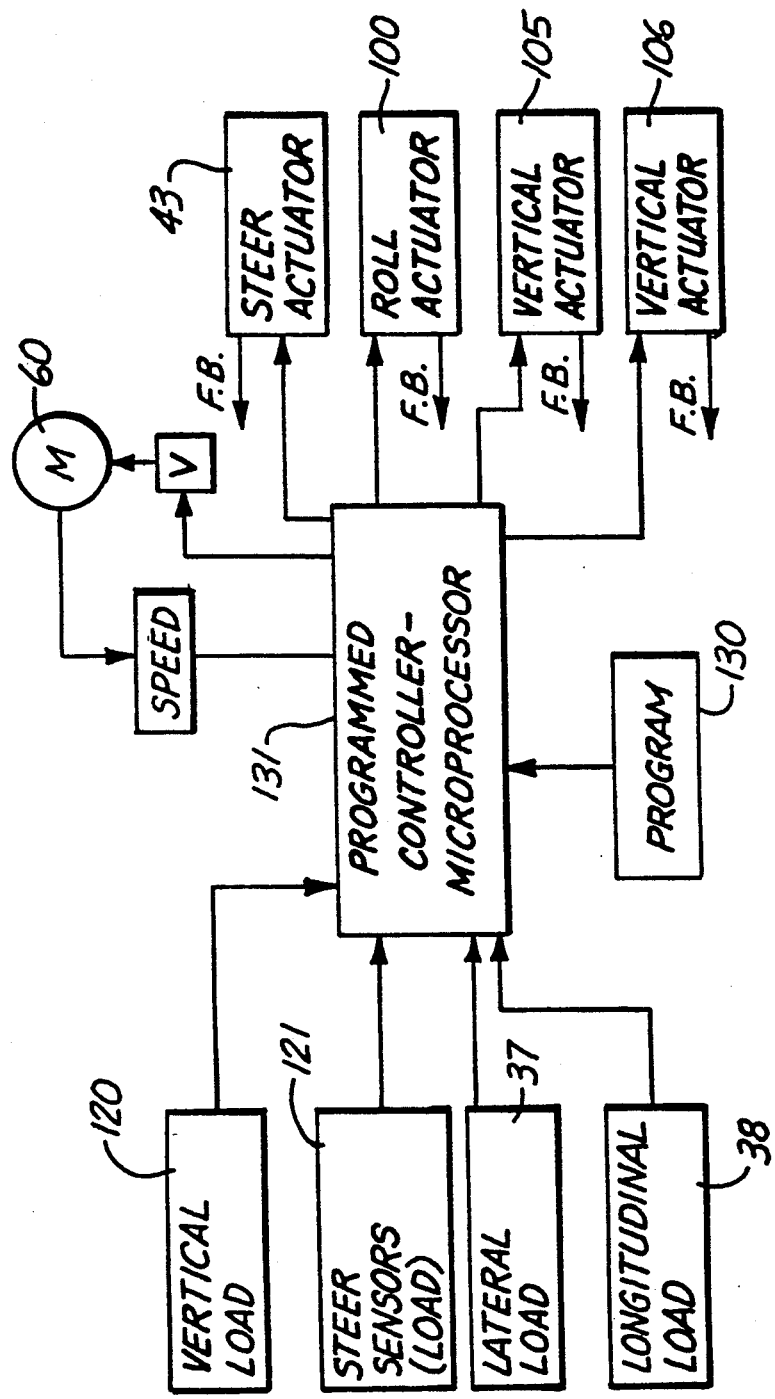
FIG. 8 is a simplified block diagram of a portion of a typical control circuit for the present invention.

The steer loads, coupled with the speed signal can be used for determining whether or not a roll input, or whether a lift or pitch input should be made. FIG. 8 schematically shows a control system, and program input indicated generally at 130 will contain a program that had been recorded from actual operation of a vehicle under a number of different types of driving conditions and will be used for reproduction on a test system. This will be fed into a controller that contains a micro processor and suitable programming. The controller 131 will have inputs from the vertical load sensors 120, the steer load sensors 121, the lateral load sensors 37, and the longitudinal load sensors 38, and will also provide outputs to the hydraulic motors 60 that drives the roadways. The controller provides signals to the steer control actuators indicated generally at 43 to effect steering of the roadways. This will cause individual steering control of the roadway assemblies 20 in a program, and adjustments or inputs will be made to the roll actuator 100, or to the vertical actuators 105 and 106 to simulate the overall motion of the vehicle during actual driving.

Feedback signals will determine whether or not the proper loads are being exerted, and adjustments can be made as to the speed of the roadway belts, the steer angles of the roadways, the need for roll, pitch or vertical movement of the vehicle. The passive restraint permits these movements to be simulated very accurately in the test system when based upon data determined from actual test operations.

The roll actuator for adding in roll moment, and the pitch and vertical actuators are for simulation steering and wind effect, as stated. In a laboratory, no wind is developed, so when the wheels and tires are rotating, there is no aerodynamic lift. On a road, there is a lift created, and when going around corners on a road, the vehicle will tend to roll. These forces or loads can be simulated with the present invention.

The linkages shown herein are chosen as to which axes or motions are restrained or fixed, and which are free. The linkage permits movement in the unrestrained degrees of freedom without effecting loads in the restrained directions. However, with the present linkage, the lateral and yaw restraints are interdependent, and are not made so that they will operate independently. The longitudinal forces can be independently restrained.

Referring specially to FIGS. 5 and 6, a second form of the restraint system of the present invention is illustrated, which accomplishes the same restraint in the same three controlled directions, namely longitudinal, lateral and yaw directions. The second form of the invention does not permit adding roll components as conveniently, or putting aerodynamic pitch, but such additions can be made if desired.

The restrain system indicated generally at 140 includes a pair of main beams 141 and 142 which are spaced laterally apart, and have first ends mounted through universal couplings (universal pivoting) 143, to brackets 144 that are anchored to the base. The opposite ends of the main beams 141 and 142 are coupled through universal couplings 145,145 to a yaw restraint bracket indicated at 146. The universal couplings 145 have effective centers of loading that are on an axis that passes through the center of gravity 147 of the vehicle.

The yaw restraint comprises a frame having a pair of generally horizontal bars 150 and 151, which are spaced apart in longitudinal direction of the test vehicle, and are held with suitable uprights 152 and braces 153 so that they support the universal couplings 145 for universal pivoting about points that lie along a line passing through the test vehicle center of gravity 147. The yaw restraint bars 150 and 151 are spaced longitudinal sufficiently so that when attached to a vehicle, in a conventional manner (bolted to a unibody construction) the brackets will not permit the vehicle to twist or rotate relative to the brackets about an upright axis passing through the vehicle center of gravity. Thus, yaw is restrained by bracket 146, comprising a bracket that extends transversely to the beams 141 and 142 to restrain yaw.

The lateral restrain is accomplished by utilizing a first link 155 that is pivotally mounted through universal pivotal couplings 156 at its opposite ends to the respective beams 141 and 142. The couplings 156 re positioned between the connectors 144 and 145 on the beams 141 and 142. A second restraint link 157 is connected through a universal pivotal connection 158 to the mid portion of the link 155. The opposite end of link 157 is connected through a universal coupling 159 to a bracket 162 that is mounted relative to the base 11.

The roadway support assemblies 20 are the same as those in the previous form of the invention. The restraint is in three directions or degrees of freedom, namely, lateral and yaw, which is accomplished through a linkage that does not affect restraint in roll moment, pitch moment or vertical direction. The main beams 141 and 142 are parallel to the longitudinal axis 165 of the vehicle.

In both forms of the invention, therefore, the restraining the vehicle in desired directions is obtained without inducing loads in the other directions or degrees of freedom.

Figure 7:
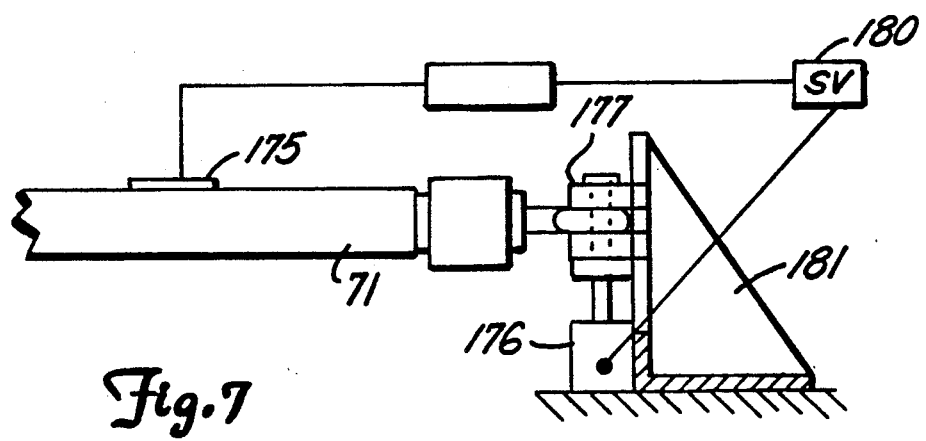
FIG. 7 is a schematic view of a linkage leveling arrangement usable with the present invention.

The main beams 141 and 142 in the second form of the invention, and 71 and 72 of the first form of the invention, are preferably kept as long as possible in order to minimize any errors that occur as the links are moved from a reference position, for example, if they are lifted from a horizontal position. The outer ends of the beams will describe an arc if they are moved, so there may be a need for compliance between the fixed mount at the ends of the beams which is a spring or elastomer or even a servo-controlled unit for the support brackets for the main beams that would provide for maintaining the beams at a desired horizontal position parallel to the plane of the longitudinal and transverse axes passing through the vehicle center of gravity. As shown in FIG. 7, this can be done with a simple sensor 175 for determining when the beam, such as beam 71, moved from a horizontal position and providing a servo actuator 176 that would then move a sliding support 177 of the beam into a position so that it would again be horizontal. Servo valve 180 responds to the sensor 175 to move the actuator and slide relation to a bracket 181.

With the roll and the aerodynamic lift cylinders in place there can be small errors in position of the beams that attach to the vehicle as they go through an arc of movement.

The actual road forces can be simulated so that the same velocity and direction can be applied to each tire in the laboratory as those vehicles would experience on an actual road. Force or load sensors can be placed in any of the links that are desired in order to make sure the forces are accurately reproduced. Longitudinal acceleration forces can be applied through the program by accelerating the roadways (speeding up the motors) and the force control can be in three axes at once, that is, vertical, lateral, and longitudinal. When a vehicle has been analyzed with sensors during actual motions on a road or other terrain, the controls of the present invention can duplicate the forces because of the restraint system that permits restraint in three degrees of freedom and complete lack of restraint in other degrees of freedom so that, for example, forces that would have caused the car to accelerate can be used as signals to control the roadways to simulate loads from the road.

Although the present invention has been described with reference to preferred embodiments, workers skilled in the art will recognize that changes may be made in form and detail without departing from the spirit and scope of the invention.

What is claimed is:

1. A restraint apparatus for a vehicle supported on a simulated roadway and being movable in longitudinal, lateral, yaw, pitch, roll, and vertical directions, said restraint apparatus comprising:

first and second substantially parallel beams, first ends of the beams being mounted with respect to the vehicle at spaced connection locations thereon about universal pivotal connections that are each capable of moving about a connection point, a line between the connection points at the spaced connection locations of the first ends of the first and second beams passing through a desired kinematic center of the vehicle, opposite ends of said first and second beams being mounted with respect to a support base about universal pivoting connections;

a first link having a longitudinal axis parallel to the line and being pivotally mounted at opposite ends thereof to the respective beams to couple the beams together;

a second link coupled to said first link through a universal pivotal connection that pivots about a point lying in a plane normal to the first link and passing through the vehicle kinematic center; and means for coupling said second link to said base about a universal pivotal connection.

2. The apparatus of claim 1 wherein said second link is substantially parallel to the first link.

3. The apparatus as specified in claim 1 wherein said first and second beams are perpendicular to a longitudinal axis of a vehicle restrained by said beams, and wherein said first and second links are substantially parallel to such longitudinal axis.

4. The apparatus as specified in claim 1 wherein the vehicle has a plurality of wheels and the stimulated roadway comprises a plurality of endless belts moving on belt support bearings operated through variable speed motors for driving each of the wheels of the vehicle, said endless belts being mounted to permit movement about vertical axes to simulate steering load.

5. The apparatus as specified in claim 1 including means for separately measuring forces acting on the beams along longitudinal axes of the beams, and means for measuring forces on the second link, to permit resolving the restraining forces in longitudinal, lateral and the yaw directions.

6. The apparatus as specified in claim 1 wherein said first and second beams are generally parallel to a longitudinal axis of a vehicle being restrained and said first and second links extend generally laterally of such vehicle.

7. A restraint apparatus for a vehicle supported on a simulated roadway, said vehicle being movable in longitudinal, lateral, yaw, pitch, roll, and vertical directions, said restraint apparatus comprising:

beam means having substantially parallel beams mounted with respect to the vehicle at spaced connection locations thereon about pivotal connections that are each capable of moving about a connection point, a line between the connection points at the spaced connection locations passing through a desired kinematic center of the vehicle, an opposite end of each of said beams being mounted with respect to a support base about a pivoting connection;

a restraint linkage mounted to the beam means and having first and second link portions, said first link portion having ends pivotally connection to the beam means, between the ends of the beams, an end of the second link portion being connected to the first link portion through a movement of the beam means in desired degrees of freedom to restrain movement of the beam means in a longitudinal direction of the second link portion; and means for pivotally coupling said second link portion to said support base to restrain movement of the beam means in a longitudinal direction of the second link portion.

8. A restraint apparatus for a vehicle having a longitudinal axis supported on a simulated roadway that restrains said vehicle from substantial movement in longitudinal, lateral and yaw degrees of freedom and allows substantially unrestrained motion in roll, pitch and vertical degrees of freedom, said restraint apparatus comprising:

first and second substantially parallel beams, first ends of each beam being pivotally coupled to the vehicle and the second ends of each beam being pivotally attached to a support base in such manner that said beams restrain motion of the vehicle along a first axis that passes generally through a vehicle kinematic center and restrain motion rotationally about a second axis which is perpendicular to said first axis and which passes generally through said vehicle kinematic center;

a first link having opposite ends, each end thereof being pivotally connected at a point on each of first and second beams between the ends of each of said beams, with said first link being generally perpendicular to the first and second beams and generally parallel to a third axis which is mutually perpendicular to the first and second axes and which passes through said vehicle kinematic center; and a second link pivotally connected at a first end to said first link and pivotally connected at a second end to the support base in such manner that the restraining force provided by second link is generally coincident with a line between end pivots of said first link to restrain motion of the vehicle in the said third axis in combination with the first link and the first and second beams connected to the first link.

9. The apparatus as specified in claim 8 and displacement measuring means coupled to the apparatus and oriented to measure vertical displacement on at least one end of said vehicle.

10. The apparatus as specified in claim 8 and means to measure the movement of the vehicle in a rotational direction about a longitudinal axis thereof relative to a reference plane.

11. The apparatus as specified in claim 8 and actuator means for providing a force acting through at least one of said beams to move a vehicle in a direction generally perpendicular to the plane containing longitudinal axes of the beams and the kinematic center of the vehicle.

12. The apparatus as specified in claim 11 wherein there are a pair of vertical actuators, one of which is connected to each beam to control independent motion of each beam in a direction perpendicular to the plane containing the longitudinal axes of the beams and the kinematic center.

13. The apparatus as specified in claim 8 and actuator means for exerting a roll motion on the vehicle comprising a moment about the longitudinal axis of the vehicle supported by the apparatus.

14. The apparatus as specified in claim 8 and means for permitting compliance movement of the beam ends relative to the support base in the direction of the longitudinal axes of the beams and the kinematic center.

15. The apparatus as specified in claim 8, and actuator means connected between the support base and each of the beams for adjusting the effective length of said beams in direction along their longitudinal axes.

16. The apparatus as specified in claim 15, and the second actuator means connected between the support base and the second link, for controlling the position of the second link along its longitudinal axis relative to the base.

17. The apparatus as specified in claim 8, wherein said first and second beams have longitudinal lengths between their ends, and wherein said longitudinal lengths are parallel to a longitudinal axis of the vehicle restrained by said first and second beams, and wherein said first and second links are substantially perpendicular to such longitudinal axis.

18. The apparatus as specified in claim 8, wherein said first and second beams extend substantially perpendicular to a longitudinal axis of the vehicle restrained by the beams, means for separately measuring forces acting on the first and second beams along longitudinal axes of the beams, and means for measuring forces on the second link, to permit resolving the restraining forces in longitudinal, lateral and yaw directions.

19. The apparatus as specified in claim 18, and a pair of vertical actuators, one of which is connected to each of the first and second beams to control independent motion of each beam in a direction perpendicular to the plane containing the longitudinal axes of the beams and the kinematic center of the vehicle.

* * * * *